United States Patent [19]

Niebauer

[11] Patent Number: 5,122,017
[45] Date of Patent: Jun. 16, 1992

[54] CUTTING INSERT WITH CHIP CONTROL

[75] Inventor: Kenneth L. Niebauer, Raleigh, N.C.

[73] Assignee: Kennametal Inc., Latrobe, Pa.

[21] Appl. No.: 657,482

[22] Filed: Feb. 19, 1991

[51] Int. Cl.⁵ .............................................. B23B 27/22
[52] U.S. Cl. ...................................... 407/114; 407/115
[58] Field of Search ........................... 407/114–116, 407/113

[56] References Cited

U.S. PATENT DOCUMENTS

| | | | |
|---|---|---|---|
| D. 305,662 | 1/1990 | Niebauer | D15/139 |
| 3,733,664 | 5/1973 | McKelvey | 29/95 |
| 4,035,541 | 7/1977 | Smith et al. | 428/217 |
| 4,056,871 | 11/1977 | Bator | 407/114 |
| 4,087,192 | 5/1978 | Hertel | 407/114 |
| 4,318,645 | 3/1982 | McCreery | 407/114 |
| 4,344,725 | 8/1982 | Seidel | 407/114 |
| 4,447,175 | 5/1984 | Warren | 407/114 |
| 4,610,931 | 9/1986 | Nemeth et al. | 428/547 |
| 4,846,609 | 7/1989 | Bernadic et al. | 407/114 |
| 4,915,548 | 4/1990 | Fouquer et al. | 407/114 |
| 4,934,879 | 6/1990 | van Barneveld | 407/66 |
| 4,959,331 | 9/1990 | Mehrotra et al. | 501/89 |
| 4,959,332 | 9/1990 | Mehrotra et al. | 501/87 |
| 4,963,061 | 10/1990 | Katbi et al. | 407/114 |
| 4,984,940 | 1/1991 | Bryant et al. | 407/119 |

FOREIGN PATENT DOCUMENTS 0364421 4/1990 European Pat. Off. .

OTHER PUBLICATIONS

Sumitomo Electric brochure "Sumitomo AC15 Ceramic Coated Inserts," (available at trade show in Sep., 1990). p. 3.
Sumitomo Electric brochure "Sun Bumpy Insert EMU Series," (available at trade show in Sep., 1990.)
Kennametal, Kennametal/85 Catalog, Technical Data Section 9, pp. 283–291, Pub. No. A84-18(140)J4.
Kennametal, Chip Control Inserts Advertisement, Pub. No. MM8507.
Kennametal, New KC990 Advertisement, Pub. No. A89-45(25)C9.

Primary Examiner—Larry I. Schwartz
Assistant Examiner—J. R. Daulton
Attorney, Agent, or Firm—James G. Porcelli

[57] ABSTRACT

An indexable cutting insert is shown capable of cutting operations over a wide range of parameters such as depth of cut or feed rate. The insert has different geometries at certain locations on the cutting surface such that under differing parameters a desirable cutting surface will be in contact with the workpiece.

13 Claims, 6 Drawing Sheets

CUTTING INSERT WITH CHIP CONTROL

CROSS REFERENCE TO RELATED APPLICATIONS

This application is related to copending U.S. Pat. application Ser. No. 07/657,483, filed Feb. 19, 1991, entitled "Cutting Insert with Chip Control," by Kenneth L. Niebauer.

BACKGROUND OF THE INVENTION

The present invention relates to cutting tools and, in particular, to an indexable cutting insert having a chip control geometry providing chip control over a wide range of parameters such as depth of cut or feed rate.

With the current selection of cutting insert geometries, it is necessary, when the depth of cut or the feed rate is significantly altered, to change the cutting insert to one having the desired geometry most effective for the specific parameters. This process not only requires changing cutting inserts to satisfy the cutting parameters, but also necessitates maintaining an inventory of various cutting inserts such that the desired insert geometry is available when needed.

It is, therefore, an object of this invention to provide a cutting insert that may effectively be utilized over a variety of parameters, and through this versatility reduce the frequency of changing inserts and reduce the need for a large variety of different insert geometries.

It is a further object of this invention to provide a chip control geometry such that effective chip control is maintained over the range of parameters for which the cutting insert is utilized.

BRIEF SUMMARY OF THE INVENTION

An indexable cutting insert is provided having a polygonal body of wear resistant material with top and bottom surfaces and therebetween a peripheral wall with sides and rounded corners. At the intersection of the peripheral wall and the top surface is a cutting edge. The top surface comprises a land area, having corner portion land areas and side portion land areas, joining the cutting edge and extending inwardly toward the center of the body. A floor, which is disposed at a lower elevation than the land area, extends between the land area and the center of the body. Sloping wall portions are inclined downwardly and inwardly from the land area to the floor.

A plateau may be disposed upon a central portion of the floor. The plateau is spaced apart from the sloping wall portions by the remaining portions of the floor. The plateau has sloped sides ascending from the floor to the top of the plateau. The plateau may also be disposed upon an elevated planar portion which extends from the floor.

In addition a projection having at least one wave-like element may be disposed upon a sloping wall portion between adjacent insert corners to provide a chip curling zone between the corners and the projection.

BRIEF DESCRIPTION OF THE DRAWING

The exact nature of the present invention will become more clearly apparent upon reference to the following detailed specification taken in connection with the accompanying drawings in which.

DETAILED DESCRIPTION OF THE INVENTION

Figure 1:
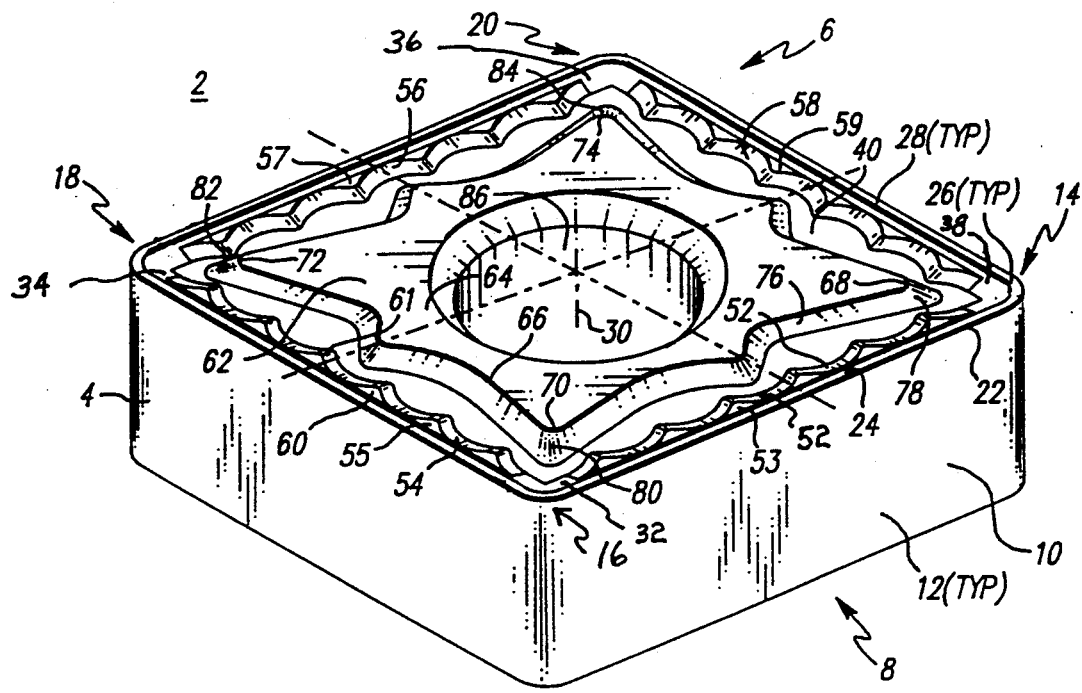
FIG. 1 is an isometric view showing one embodiment of a cutting insert according to the invention.

FIGS. 1–6 show one embodiment of the invention. FIG. 1 shows an isometric of a generally polygonal indexable cutting insert 2. The insert 2 has a polygonal body 4 of wear resistant material. The body includes a top surface 6 and a bottom surface 8 and therebetween a peripheral wall 10 having sides 12 and rounded corners 14, 16, 18 and 20. A cutting edge 22 is formed at the intersection of the top surface 6 and the peripheral wall 10.

For the purposes of this discussion an insert geometry identified as an 80 degree diamond, which is a rhombic configuration having two 80 degree corners and two 100 degree corners, will be presented. However, it should be realized that the configuration of this invention should not be limited to an 80 degree diamond and that other geometric shapes may be substituted. Among the shapes may be other rhombic configurations such as squares, a 55 degree diamond (which has two 55 degree corners and two 125 degree corners), a triangle or a trigon.

The cutting insert should be manufactured of a wear-resistant material. Refractory coated cemented carbide materials, such as KC850®, KC950® or KC990® may be used. Ceramic materials, such as KYON 4000, may also be used.

KC850® is a trademark of Kennametal Inc., representing a coated carbide grade having a TiC/TiCN/TiN coating over a substrate. An outer layer of the C porosity carbide substrate is enriched with cobalt. Further details of the coating arrangement are available in U.S. Pat. No. 4,035,541, entitled "Sintered Cemented Carbide Body Coated with Three Layers," by Smith et al., issued July 12, 1977, and assigned to the assignee herein.

KC950® is a trademark of Kennametal Inc., representing a ceramic-coated carbide grade of a TiC/Al$_2$O$_3$/TiN coating over a substrate. An outer layer the carbide substrate is cobalt enriched. Further details regarding this material are available in U.S. Pat. No. 4,610,931, entitled "Preferentially Binder Enriched Cemented Carbide Bodies and Method of Manufacture,"

by Nemeth et al., issued Sep. 9, 1986, and assigned to the assignee herein. Details of both KC850® and KC950® are further discussed in the Kennametal advertisement, entitled "Chip Control Inserts," published in 1985 as publication number MM8507.

KC990® is a trademark of Kennametal Inc., representing a multilayered coated carbide grade having a TiCN/Al$_2$O$_3$/TiN coating over a substrate. Details of the composition of this material are available in U.S. Pat. No. 4,984,940, entitled "Multilayer Coated Cemented Carbide Cutting Insert," by Bryant et al., issued Jan. 15, 1991, and assigned to the assignee herein. KC990® is further described, along with applications for cutting inserts made of KC950® and KC990®, in the Kennametal advertisement entitled "New KC990 multi-coated grade... so advanced it'll take your productivity beyond the next decade," published in 1989 as publication number A89-45(25)C9.

Pages 284 through 291 of the Kennametal catalog, entitled "Kennametal/85 Metalcutting tools for greater productivity," published in 1984 as publication number A84-18(140)J4 provide further details of KC850® and KC950®, including applications for cutting inserts made of these materials.

KYON® 4000 is a trademark of Kennametal Inc., representing a material of ceramic composition containing about 1.5% silicon carbide whiskers, about 10% zirconia, of which at least about 60 to 70% is in the form of tetragonal zirconia, and with or without minor amounts (e.g. about 0.55%) of magnesia additions, and all dispersed in an alumina matrix. Further information about KYON® 4000 type cutting inserts can be found in U.S. Pat. Nos. 4,959,331 and 4,959,332 and U.S. Pat. application Ser. No. 629,760, by inventors Beeghly et al., filed on Dec. 18, 1990, and assigned to the assignee herein.

All of the U.S. patents and the publications cited above are hereby incorporated by reference into this document.

Returning to FIG. 1, a cutting edge land area 24 extends inwardly from the cutting edge 22 toward the center 30 of the body 4. The land area 24 is comprised of corner portion land areas 26 and side portion land areas 28. Sloping wall portions 32, 34, 36 and 38 extend from the land area 24 downwardly and inwardly to a floor 40. The floor 40 is disposed at a lower elevation than the land area 24. Each of the sloping wall portion 32, 34, 36 and 38 intersects with an adjacent wall portion in the area of the corners 14, 16, 18 and 20. A smooth curve between adjacent wall portions provides an essentially uninterrupted surface around the respective corners.

Figure 2:
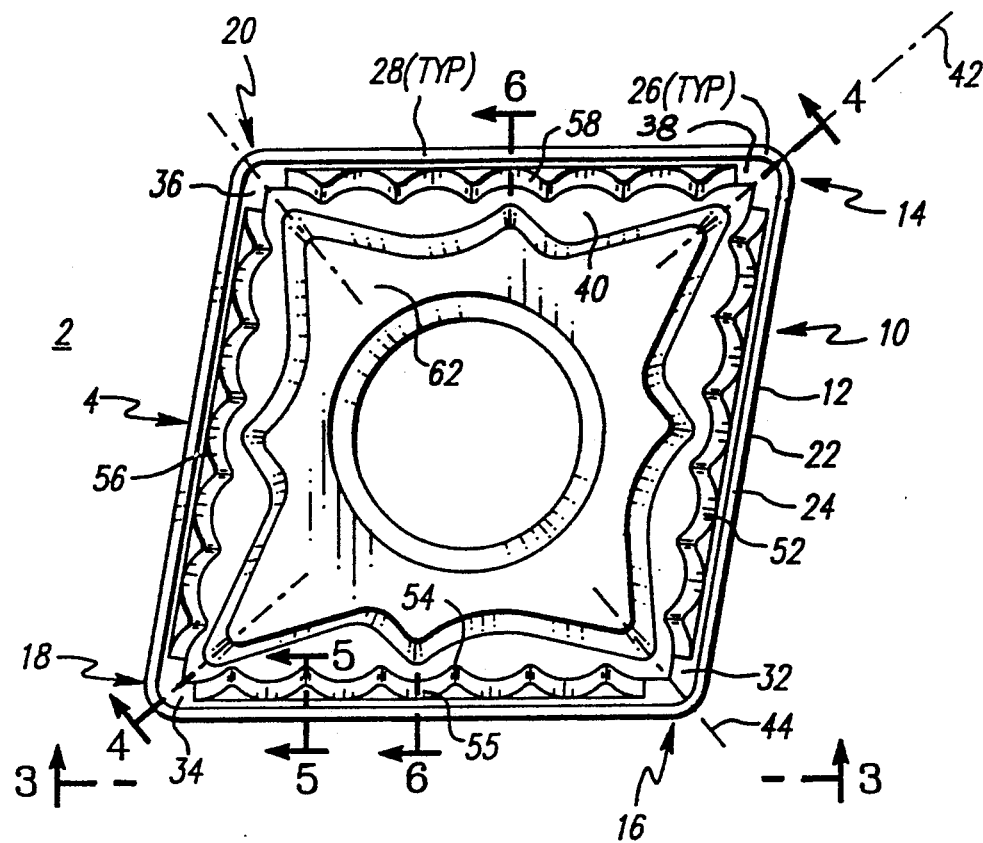
FIG. 2 is a top view of the cutting insert shown in FIG. 1.

Bisector lines 42 and 44 (FIG. 2) each bisect an angle formed by the intersection of a line extended from the cutting edge 22 along each adjacent side 12 at the respective corners 14, 16, 18 and 20. While there are actually four bisector lines, one each for the corners 14, 16, 18 and 20, because of the shape of the insert 2 shown in FIGS. 1-6, two bisector lines are common to bisector line 42 and two are common to bisector line 44. As shown in FIG. 2, the land area 24 may be of a uniform width.

As mentioned, while the 80 degree diamond configuration is shown in FIGS. 1-6, other configurations are possible. However in order to utilize the corner portions of the insert as a primary cutting surface, the included angle in a corner should be in the range of approximately 35-100 degrees. As will be discussed corners with included angles greater than that, such as certain corners in a trigon configuration, are not considered optimum for cutting.

Returning to FIG. 1, projections 52, 54, 56 and 58 are disposed upon sloping wall portions 32, 34, 36 and 38 respectively and between adjacent pairs of corners 14, 16, 18 and 20. For clarity, only details of projection 54 will be described with the understanding that projections 52, 56 and 58 are similar. Projection 54, disposed upon sloping wall portion 34, is comprised of at least one wave-like element 55 which extends downwardly and inwardly to the floor 40. The wave-like element 55 comprises a planar upper surface 60 located at an elevation below the land area 24 extending toward the center 30 of the body 4. The surface 60 intersects with a sloped face 61 which extends toward the center 10 and downward where it intersects with the floor 40. The projection 54 is spaced from the corners 16 and 18 to define a chipcurling zone between the corner 16 and the projection 54 and between the corner 18 and the projection 54. Note that element 55 may be one of a number of elements of the projection 54 and, as such, more than one element 55 may be desirable within projection 54 as illustrated in FIG. 1.

In addition to the structure of FIG. 1 just described, a plateau 62 may be disposed upon the floor 40. In FIG. 1, the plateau 62 is spaced apart from the sloping wall portions 32, 34, 36 and 38, and the projections 52, 54, 56 and 58 by the floor 40. The plateau 62 has a top surface 64 with a periphery 66 which comprises corner curves 68, 70, 72 and 74 which act to define the shape of the adjacent sloped side 76. Each corner curve 68, 70, 72 and 74 is positioned near a corner 14, 16, 18 and 20, respectively, and is bisected by a bisector line 42, 44 (FIG. 2), such that a convex ascending surface 78, 80, 82 and 84 to the top 64 of the plateau 62 is formed and aligned with each respective corner 14, 16, 18 and 20.

A circular opening 86 extending from the top surface 6 through the bottom surface 8 of the body 4 is provided in order to permit securing the cutting insert 2 to a toolholder for use in machining operations. It should be noted however that the insert may be clamped to a toolholder and, as such, circular opening 86 would not be necessary.

Further details of FIG. 1 are presented in FIGS. 2-6. FIG. 2 represents a top view of the cutting insert shown in FIG. 1. Item numbers for previously discussed portions of the cutting insert are included in FIG. 2.

Figure 3:
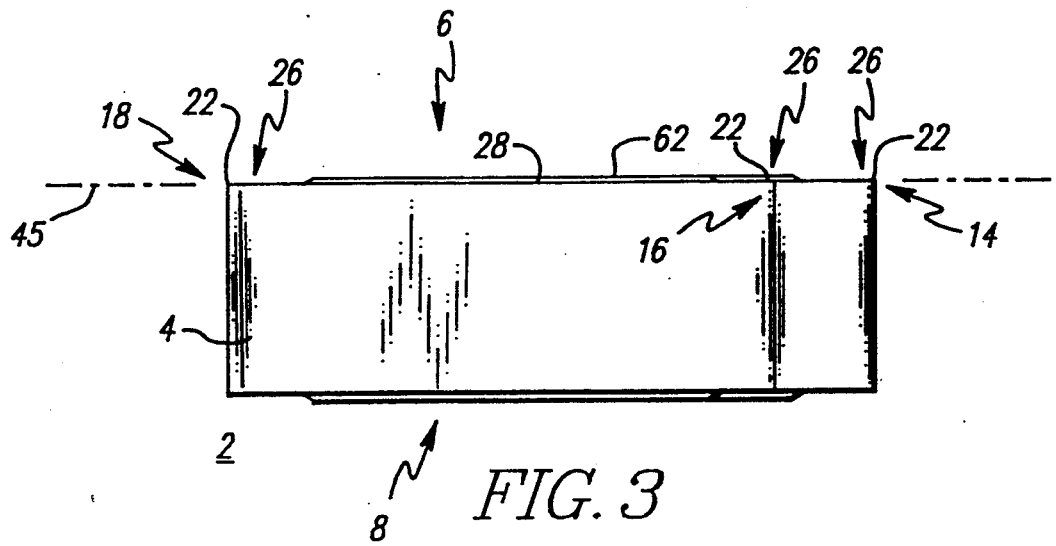
FIG. 3 is a side view of the cutting insert along arrows "3—3" in FIG. 2.

FIG. 3, a view from the side of the cutting insert shown in FIG. 2, illustrates the corner portion land area 26 of corners 14, 16 and 18 along with the cutting edge 22 and the plateau 62. It should be noted that the plateau 62 is above the level of both the corner portion land area 26 and the side portion land area 28. For this reason, the insert embodiment shown in FIGS. 1-6 may be double-sided.

With the plateau 62 raised to a level above the corner portion land area 26 and the side portion land area 28, the bottom surface 8 could be formed to resemble the top surface 6 and the cutting insert could then be invertible. In doing so, the insert may be supported on the face of the plateau 62 while the opposite side of the insert is used for metal cutting. However, in order to exploit this feature, it would be necessary to have details identical to those shown in the top surface 6 of FIG. 1 on the bottom surface 8 of FIG. 1. Furthermore, the plateau 62 should be extended toward the cutting edge 22 to provide sufficient surface area for structural support to the insert 2, as shown in FIG. 3.

A reference plane 45, shown in FIG. 3, is defined by a plane intersecting the corner portion land areas 26 at the cutting edge 22 of the body 4. Such a plane will be referenced frequently to identify angles of the insert 2.

Figure 4:
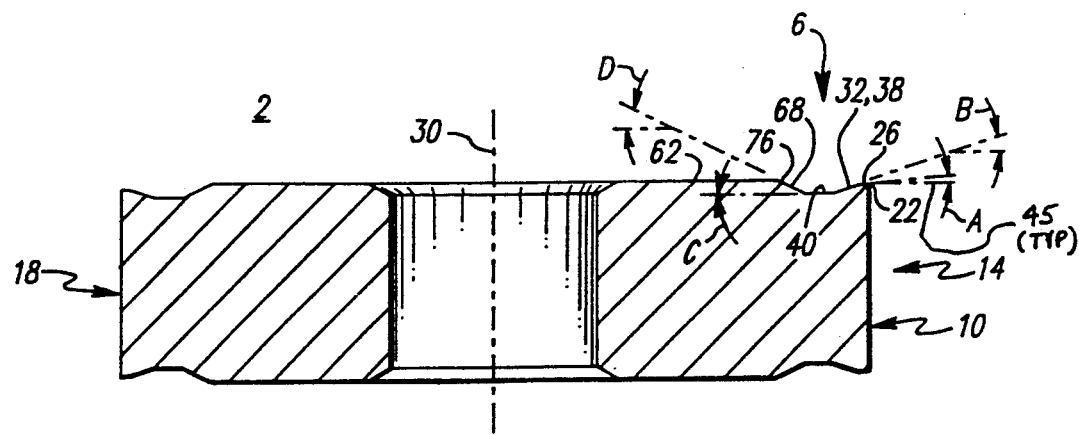
FIG. 4 is a cross-sectional view of the cutting insert viewed along a bisector line shown by arrows "4—4" in FIG. 2.

FIG. 4 illustrates a cross-section view bisecting the cutting insert 2 along arrow "4—4" which is bisector line 42. As such, this is a cross-section through corners 14 and 18, shown in FIG. 2. The top surface 6 of the cutting insert 2 intersects the peripheral wall 10 to form the cutting edge 22. The corner portion land area 26 extends from the cutting edge 20 toward the center 30 of the insert 2. The sloping wall portions 32, 38 extend from the corner portion land area 26 toward the center 30 of the insert 2 and descend to intersect with the floor 40. Reference is made to sloping wall portions 32, 38 because the bisector line 42 cuts through the transition between sloping wall portions 32 and 38.

While the surface of the corner portion land area 26 may be parallel to the reference plane in a direction toward the center 30 of the insert and as such have what is known as a neutral rake angle, the corner portion land area 26 may also form a different angle with the reference plane and as such have a positive or negative rake angle. This angle, A, may vary up to about a 10 degree deviation in either direction from the neutral rake angle. In FIG. 4, the corner portion land area 26 illustrates a positive rake angle. In the alternative, the area 26 could be oriented such that the surface extends upward from the cutting edge 22 to the center 30 thereby forming a negative rake angle. The preferred angle for A is 5 degrees positive rake angle, which is approximately as shown in FIG. 4.

The sloping wall portions 32, 38 form an angle B with the reference plane of approximately 18 degrees. The floor 40 extends toward the center 30 of the insert 2 and intersects with the sloped side 76 of the plateau 62. The floor 40 may be parallel to the reference plane or may form an angle C with the reference plane of up to approximately 4 degrees. The angle D that the sloped side 76 forms with the reference plane along the bisector line is between 15 and 30 degrees, preferably 16 degrees.

Figure 5:
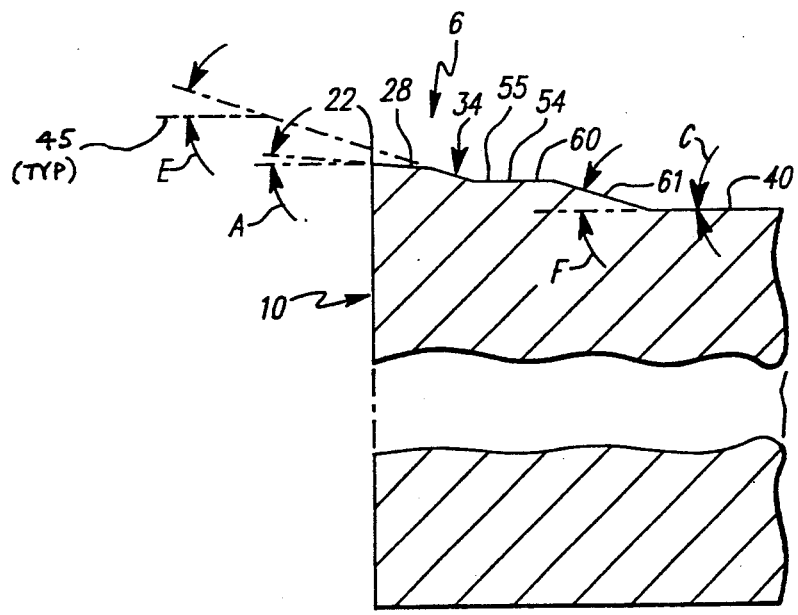
FIG. 5 is a cross-sectional view of a portion of the insert viewed along arrows "5—5" in FIG. 2.

In order to provide details of the projections 52, 54, 56 and 58 and the associated wave-like elements 53, 55, 57 and 59 respectively, FIG. 5 shows a cross-section along arrows "5—5" shown in FIG. 2 which reveals details of wave-like element 55 associated with projection 54. Just as before, the top surface 6 intersects with the peripheral wall 10 to form cutting edge 22. The side portion land area 28 extends inwardly to the sloping wall portion 34 which extends downwardly and inwardly toward the floor 40 to intersect with planar upper surface 60 of the wave-like element 55 of projection 54. The angle E with which the sloping wall portion 34 forms with the reference plane 45 is approximately 18 degrees.

The wave-like element 55 of the projection 54 is disposed upon the sloping wall portion 34 and the planar upper surface 60 of the element 55 extends from the sloping wall portion 34 inwardly toward the center (not shown) of the insert to a sloped face 61. The sloped face 61 then extends inwardly and downwardly toward the floor 40. The angle F the sloped face 61 forms with the reference plane is between 15 and 32 degrees, preferably 18 degrees. The sloped face 61 continues until it intersects with the floor 40.

Figure 6:
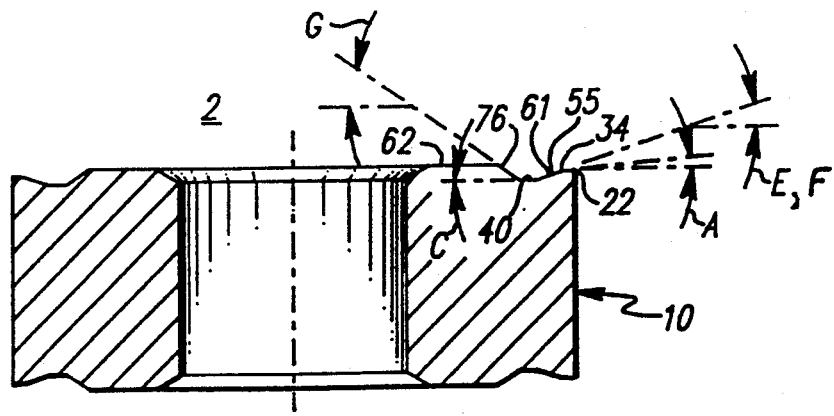
FIG. 6 is a cross-sectional view of the insert viewed along arrows "6—6" in FIG. 2.

FIG. 6 is a cross-section of the insert 2 along arrows "6—6" in FIG. 2. The details of FIG. 6 resemble those found in FIG. 5 except as noted. Specifically, since FIG. 6 is taken along a line at which the wave-like element 55 of the projection 54 is essentially flush with the sloping wall portion 34, then, as can be seen in FIGS. 1 and 6, the sloping wall portion 34 and the element 55 provide a continuous surface. However, this is only true because angle E is equal to angle F in the figures. If angle E, which is approximately 18 degrees, and angle F, which may have a range between 15 and 32 degrees, are not identical, then there would be a discontinuity (not shown) between the sloping wall portion 34 and the sloped face 61 (FIGS. 5–6). The angle G formed between the sloped side 76 and the reference plane along arrows "6—6" may be approximately between 15 and 35 degrees.

Figure 7:
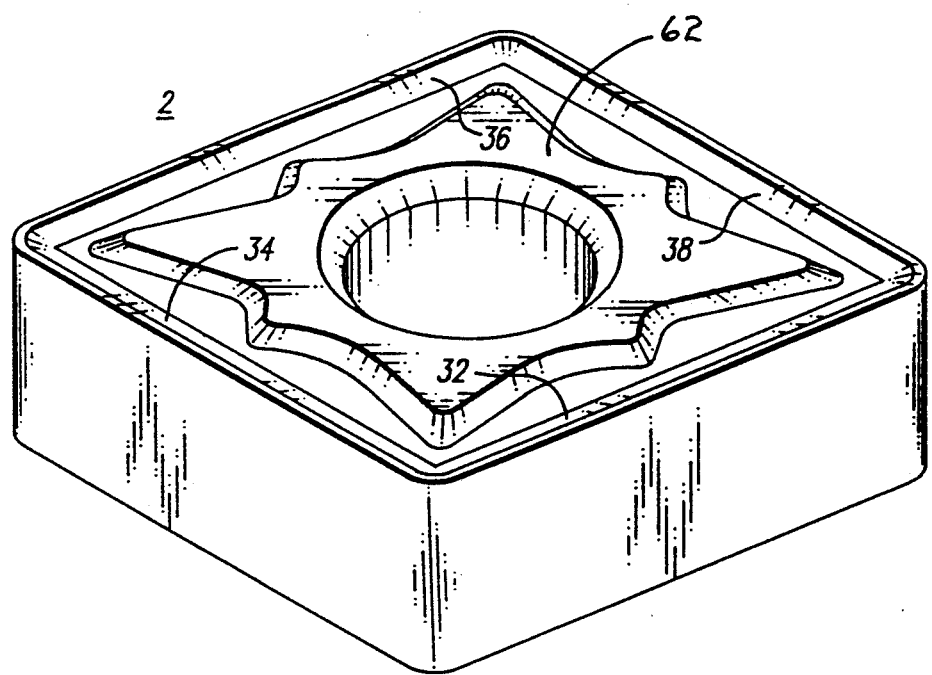
FIG. 7 is an isometric view showing an alternative embodiment of the invention similar to the embodiment illustrated in FIGS. 1–6 without the projections.

While FIGS. 1–6 have illustrated projections having wave-like elements, such as projection 52 having wave-like elements 53 in FIG. 1, another embodiment for this invention involves the insert 2 without such projections. FIG. 7 illustrates essentially the detail of FIG. 1 with the projections 53, 55, 57 and 59 removed. As such, sloping wall portions 32, 34, 36 and 38 are each continuous surfaces uninterrupted by the projections.

Another embodiment of this invention involves an insert without the plateau 62 in which the floor 40 extends over a central portion of the insert 2. From examination of FIGS. 1–7 an insert without the plateau 62 should be easily visualized.

Figure 8:
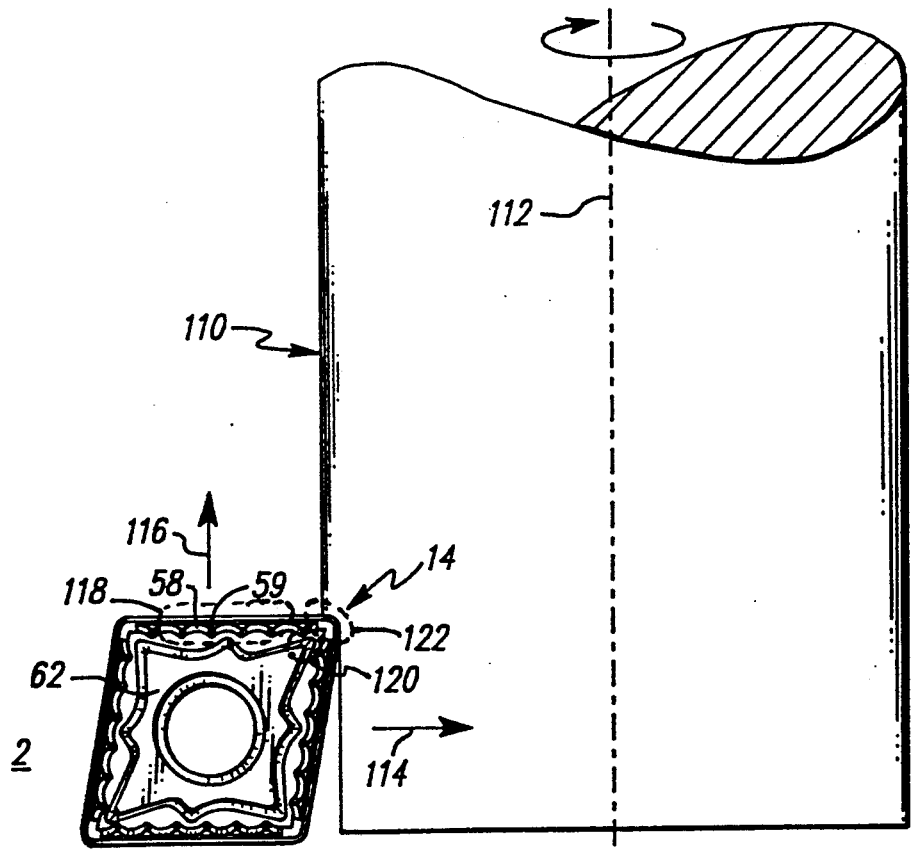
FIG. 8 is a top view identical to that shown in FIG. 2 with the addition of a workpiece to illustrate one position in which the cutting insert may be utilized.

To generally illustrate the utility of different portions of the cutting insert for chip control, FIG. 8 shows the cutting insert 2 of FIG. 2 positioned with a workpiece 110 rotating about an axis 112 at a certain angular velocity. It should be noted that the size of the cutting insert 2 is intentionally exaggerated relative to the workpiece 110 to show features. The cutting insert 2 is positioned in the direction of arrow 114 to a depth relative to the workpiece edge. This position relative to the workpiece 110 is known as the depth of cut. The cutting insert 2 is advanced into the workpiece 110 in the direction of arrow 116 at a rate known as the feed rate.

For a heavy depth of cut and a light feed rate, region 11B will be enqaged with the workpiece 110 and the projection 58 and wave-like elements 59 will contact the workpiece 110. For a heavy depth of cut and a heavy feed rate, region 120 will be engaged and the plateau 62 will be contacted. Finally, for a light depth of cut and a medium feed rate, region 122 will be engaged and the corner 14 will be contacted.

It should be noted that chip control is also a function of speed determined by, in this instance, the angular velocity of the workpiece 110. Chip control is enhanced by higher speeds, however, greater stress is placed upon the cutting insert and as such certain insert materials are not acceptable. Specifically, when the cutting insert is made of KYON ® 4000 or similar materials, higher speeds are possible and acceptable chip control is possible.

Figure 9:
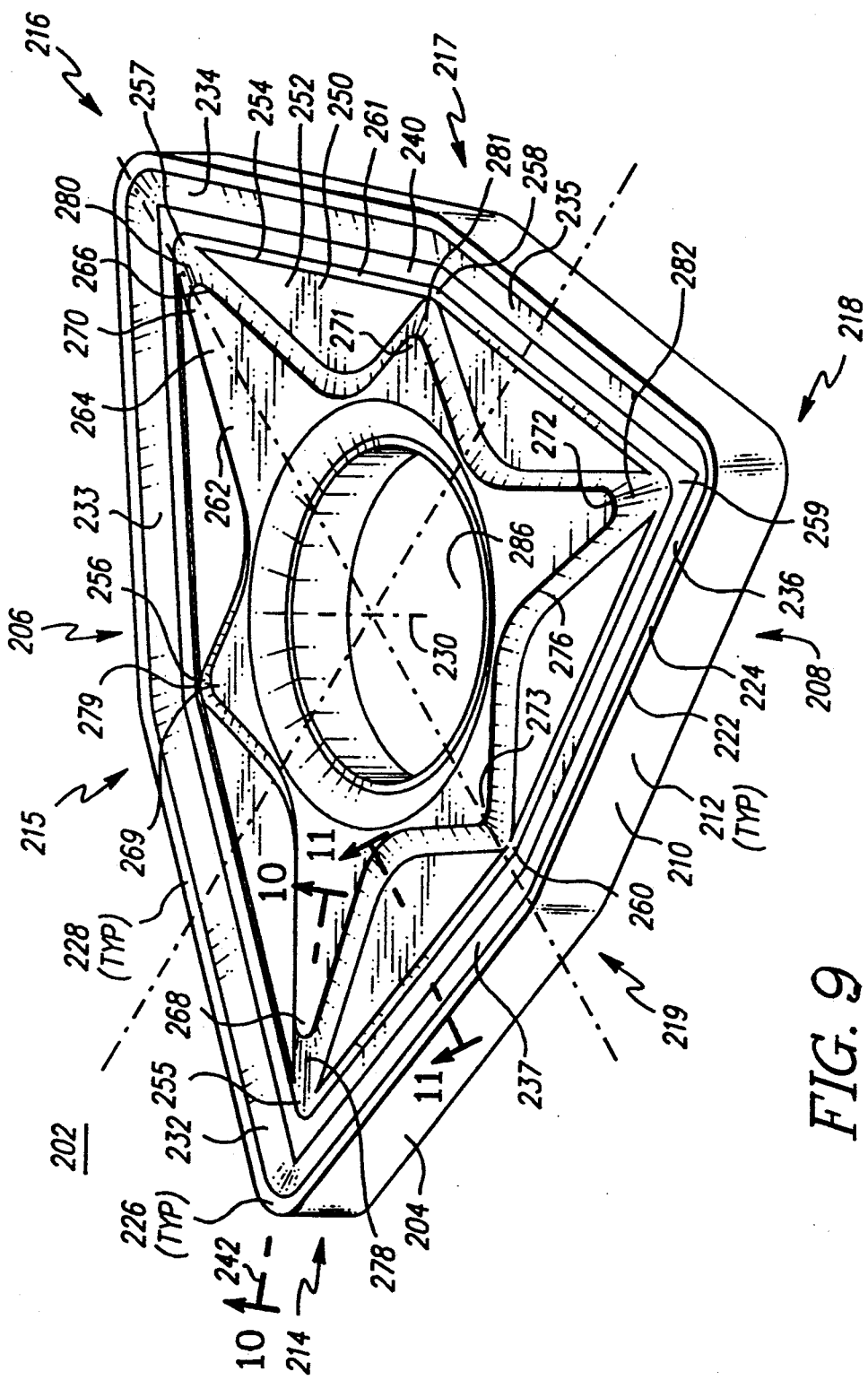
FIG. 9 is an isometric of an alternate embodiment using a trigon configuration with the addition of an elevated planar portion.

FIG. 9 illustrates an isometric view of an insert showing additional features of the present invention. For illustrative purposes, the configuration, known as a trigon, is shown in FIG. 9. A trigon is a generally triangular configuration in which none of the included angles is less than or equal to 60 degrees. In FIG. 9 the trigon configuration has three included angles of approximately 80 degrees each and three included angles of approximately 160 degrees each. FIG. 9 shows a trigonal indexable cutting insert 202 which has a body 204 of wear resistant material. The wear resistant material may be similar to that material previously discussed.

The body includes a top surface 206 and a bottom surface 208 and, therebetween, a peripheral wall 210 having sides 212 and rounded corners 214 through 219. A cutting edge 222 is formed at the intersection of the top surface 206 and the peripheral wall 210. A cutting edge land area 224 extends inwardly from the cutting edge 222 toward the center 230 of the body 204. The land area 224 is comprised of corner portion land areas 226 and side portion land areas 228. Sloping wall portions 232 through 237 extend from the land area 224 downwardly and inwardly to a floor 240. The floor 240 is disposed at a lower elevation than the land area 224. Each of the sloping wall portions 232 through 237 intersects with an adjacent wall portion in the area of the corners 214 through 219. A smooth curve between adjacent wall portions may provide an essentially uninterrupted surface around the respective corners.

Bisector line 242 bisects an angle formed by the intersection of a line extended from the cutting edge 222 along each adjacent side 212 at the corner 214. While there are actually six bisector lines, one each for the corners 214 through 219, because of the shape of the insert 202 shown in FIGS. 9 through 11, only one bisector line 242 will be shown with the understanding that similar bisector lines exist at the other corners 215 through 219. As shown in FIG. 9, the land area 224 may be of a uniform width.

Figure 10:
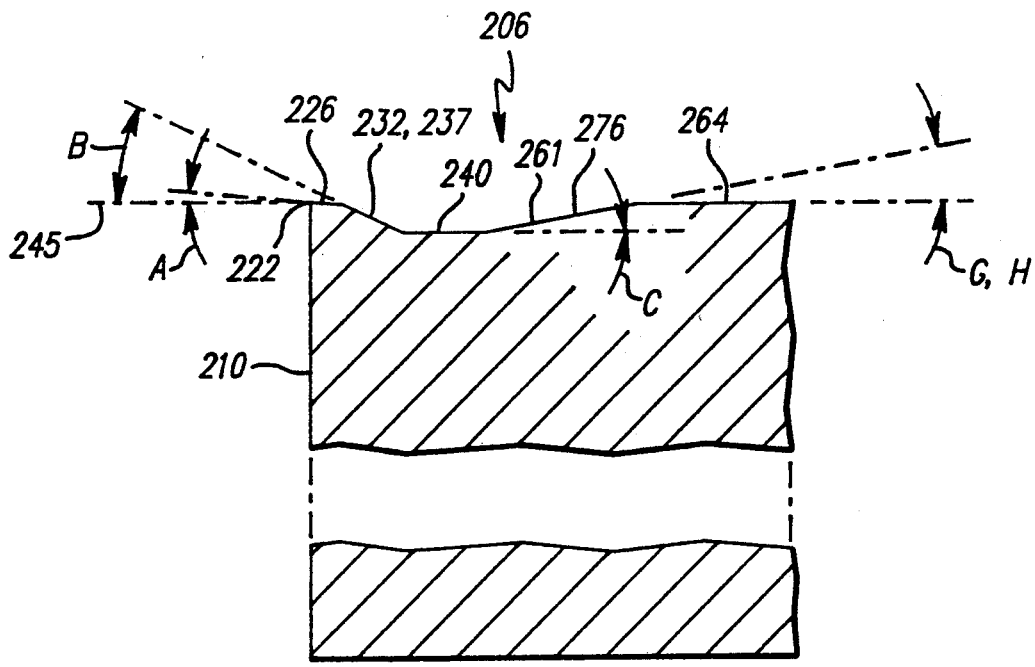
FIG. 10 is a cross sectional view of a portion of the insert viewed along arrows "10—10" in FIG. 9.

A reference plane 245, shown in FIG. 10, is defined by a plane intersecting the corner portion land area 226 at the cutting edge 222. Such a plane will be referenced to identify angles of the insert 202.

In addition to the structure of FIG. 9 just described, an elevated planar portion 250 may be disposed upon the floor 240. In FIG. 9 the elevated planar portion 250 is spaced apart from the sloping wall portions 232 through 237 by the floor 240. The elevated planar portion 250 has an upper surface 252 with a perimeter 254 which comprises planar portion corner curves 255 through 260 which act to define the shape of the adjacent planar portion sloped side 261. Each corner curve 255 through 260 is positioned near a corner 214 through 219, respectively, and is bisected by a bisector line, such that a convex ascending surfaces are formed from the floor 240 to the upper surface 252 of the elevated planar portion 250 and are aligned with each respective corner 214 through 219.

A plateau 262 may be disposed upon the elevated planar portion 250 within the perimeter 254 of the planar portion upper surface 252. The plateau 262 has a top surface 264 with a periphery 266 which comprises corner curves 268 through 273 which act to define the shape of the plateau sloped side 276. Each plateau corner curve 268 through 273 is positioned near a corner 214 through 219, respectively, and is bisected by a bisector line such that in conjunction with the planar portion corner curves 255 through 260, convex ascending surfaces 278 through 283 from the floor 240 to the top 264 of the plateau 262 are formed and aligned with respective corners 214 through 219.

A circular opening 286 extending from the top surface 206 through the bottom surface 208 of the body 204 is provided in order to permit securing the cutting insert 202 to a toolholder for use in machining operations. It should be noted, however, that the insert may be clamped to a toolholder and, as such, circular opening 286 would not be necessary.

Figure 11:
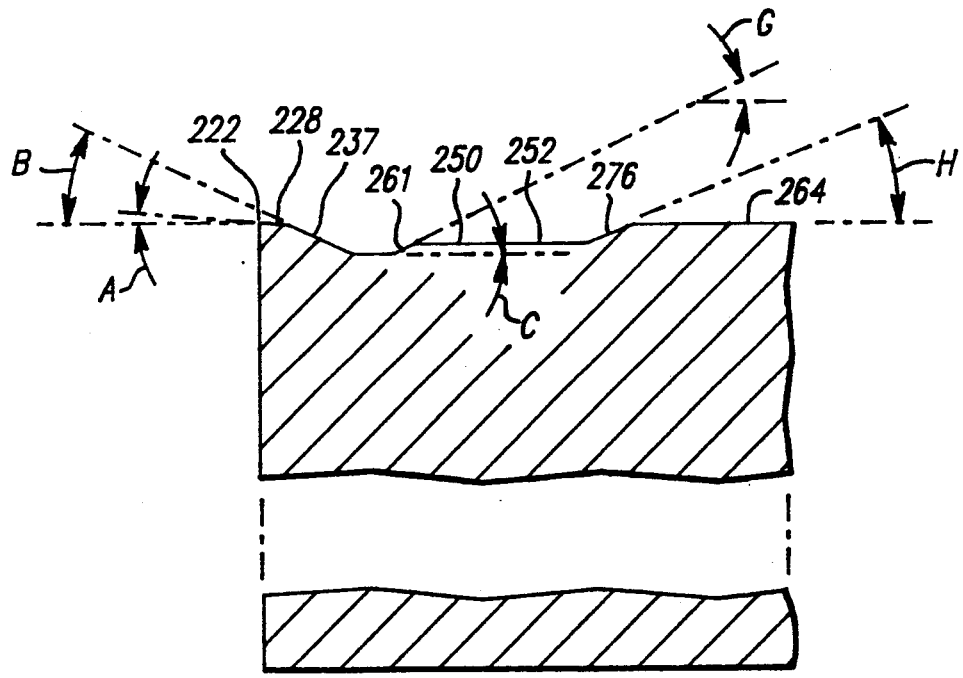
FIG. 11 is a cross-sectional view of a portion of the insert viewed along arrows "11—11" in FIG. 9.

Further details of FIG. 9 are presented in FIGS. 10 and 11. FIG. 10 illustrates a cross-section view bisecting the cutting insert along arrow 10—10 which is bisector line 242. As such, this is a cross section through corner 214, shown in FIG. 9. The top surface 206 of the cutting insert intersects the peripheral wall 210 to form the cutting edge 222. The corner portion land area 226 extends from the cutting edge 220 toward the center (not shown) of the insert. The sloping wall portions 232 and 237 extend from the corner portion land area 226 toward the center of the insert and descend to intersect with the floor 240. Reference is made to sloping wall portions 232 and 237 because the bisector line 242 cuts through the transition between sloping wall portions 232 and 237.

Just as before, while the surface of the corner portion land area 226 may be parallel to the reference plane in a direction toward the center 230 of the insert 202, and, as such, have what is known as a neutral rake angle, the corner portion land area 226 may also form a different angle with the reference plane and, as such, have a positive or negative rake angle. This angle, A, may vary up to about a 10 degree deviation in either direction from the neutral rake angle. In FIG. 10, the corner portion land area 226 illustrates a positive rake angle. In the alternative, the area 226 could be oriented such that the surface extends upward from the cutting edge 222 to the center thereby forming a negative rake angle. The preferred angle for A is 5 degrees positive rake angle, which is approximately as shown in FIG. 10.

The sloping wall portions 232 and 237 form an angle B with the reference plane 245 of approximately 18 degrees. The floor 240 extends toward the center of the insert and intersects with the planar portion sloped side 261 of the elevated planar portion. The floor 240 may be parallel to the reference plane or may form an angle C with the reference plane of up to approximately 4 degrees. The planar portion sloped side 261 forms an angle G with the reference plane along the bisector line 242 of approximately between 15 and 30 degrees, preferably 16 degrees.

FIG. 10 also shows the plateau sloped side 276 at the plateau corner curve. As shown in FIG. 9 the plateau sloped side 276 and the planar portion sloped side 261 at bisector line 242 form a continuous slope from the floor 240 to the top 264 of the plateau. For this reason the angle H the plateau sloped side 276 forms with the reference plane 245 along the bisector line 242 is similar to and may have a similar range to that of angle G.

Returning to FIG. 9, corners 214, 216 and 218 each have an included angle of about 80 degrees and corners 215, 217 and 219 each have an included angle of about 160 degrees. As mentioned earlier, when corners are used as a primary cutting surface for cutting operations, optimum performance occurs when the included angle of a corner ranges from approximately 35-100 degrees. As such using corners 215, 217 and 219 as a major cutting surface in a cutting operation would not provide optimum results.

FIG. 11 is a cross-section of the insert 202 along arrows 11—11 in FIG. 9. The details of FIG. 11 resemble those figures found in FIG. 10, except as noted. Specifically, since FIG. 11 is taken along a line at which the planar portion sloped side 261 is separate from the plateau sloped side 276 the elevated planar portion 250 and upper surface 252 separate the planar portion sloped side 261 from the plateau sloped side 276. However, the angles G and H which each sloped side forms with the reference plane 245 may be similar to those discussed earlier.

Finally it should be appreciated that the elevated planar portion shown in FIGS. 9 through 11 may also be utilized in the insert designs shown in FIGS. 1 through 7 and that the elevated planar portion may be removed from the insert in FIG. 9 through 11 such that the plateau is disposed directly upon the floor.

What has been described is a cutting insert having a geometric configuration permitting the insert to be used under a variety of cutting parameters and providing chip control under each of these parameters. Modifications may be made within the scope of the appended claims.

What is claimed is:

1. An indexable cutting insert comprising a polygonal body of wear resistant material, said body including top and bottom surfaces and therebetween a peripheral wall with sides and rounded corners, the intersection of said peripheral wall and said top surface forming a cutting edge, said top surface comprising:
    a) a land area joining said cutting edge and extending inwardly toward a center of said body wherein a reference plane is defined by a plane intersecting the land area at the corners along the cutting edge;
    b) a floor between said land area and center of said body disposed at a lower elevation than said land area,
    c) sloping wall portions inclined downwardly and inwardly from said land area to said floor; and
    d) a plateau disposed upon a central portion of said floor, said plateau spaced apart from said sloping wall portions and said plateau having sloped sides ascending from said floor and wherein the plateau has a top surface with a periphery defining corner curves, with each corner curve positioned about a respective bisector line, each bisector line defined as the line which bisects an angle formed by the intersection at an insert corner of lines extended from the cutting edge to said corner, and each corner curve defining the shape of the adjacent sloped side such that the adjacent sloped side forms a convex ascending surface from the floor to the top of the plateau and is aligned with the respective corner, said periphery tapering toward each corner such that the perpendicular distance from a respective bisector line to the periphery continuously decreases along the bisector line toward a corner.

2. The cutting insert according to claim 1 wherein the periphery of said plateau further comprises curves defining convex ascending surfaces at locations between respective corner curves.

3. The cutting insert according to claim 1 further comprising a projection having a plurality of adjacent wave-like elements disposed upon a sloping wall potion between adjacent pairs of corner portions, each of said wave-like elements comprising a planar upper surface protruding from said sloping wall portion and located at an elevation below said land area sand above said floor and extending toward a center from said sloping wall portion and also comprising a downwardly and inwardly sloped surface extending from said planar surface to said floor, said wave-like elements being spaced from said corners portions to define a chip curling zone between said corner portions and said projection and between respective adjacent wave-like elements.

4. The cutting insert according to claim 1 wherein the land area along each bisection line forms a rake angle of between −10 and +10 degrees with the reference plane.

5. An indexable cutting insert comprising a polygonal body of war resistant material, said body including top and bottom surfaces and therebetween a peripheral wall with sides and rounded corners, the intersection of said peripheral wall and said top surface forming a cutting edge, said top surface comprising:
    a) a land area joining said cutting edge and extending inwardly toward a center of said body wherein a reference plane is defined by a plane intersecting the land area t the corners along the cutting edge;
    b) a floor between said land area and center of said body disposed at a lower elevation than said land area,
    c) sloping wall portions inclined downwardly and inwardly from said land area to said floor; and
    d) a projection having a plurality of adjacent wave-like elements disposed upon a sloping wall portion between adjacent pairs of corner portions, each of said wave-like elements comprising a planar upper surface protruding from said sloping wall portion and located at an elevation below said land area and ago e said floor and extending toward a center from said sloping wall portion and also comprising a downwardly and inwardly sloped surface extending from said planar surface to said floor, said wave-like elements being spaced from said corner portions to define a chip curling zone between said corner portions and said projection and between respective adjacent wave-like elements.

6. The cutting insert according to claim 5 further including a plateau disposed upon a central portion of said floor, said plateau spaced apart from said sloping wall portions and said plateau having sloped sides ascending from said floor.

7. The cutting insert according to claim 6 wherein the plateau has a top surface with a periphery defining corner curves, with each corner curve positioned about a respective bisector line, each bisector line defined as the line which bisects an angle formed by the intersection at an insert corner of lines extended from the cutting edge to said corner, and each corner curve defining the shape of the adjacent sloped side such that the adjacent sloped side forms a convex ascending surface from the floor to the top of the plateau and is aligned with the respective corner, said periphery tapering toward each corner such that the perpendicular distance from a respective bisector line to the periphery continuously decreases along the bisector line toward a corner.

8. The cutting insert according to claim 6 wherein the periphery of said plateau further comprises curves defining convex ascending surfaces at locations between respective corner curves.

9. An indexable cutting insert comprising a polygonal body of wear resistant material, said body including top and bottom surfaces and therebetween a peripheral wall the sides and rounded corners, the intersection of said peripheral wall and said top surface forming a cutting edge, said top surface comprising:
    a) a land area joining said cutting edge and extending inwardly toward a center of said body wherein a reference plane is defined by a plane intersecting the land area at the corners along the cutting edge and in the land area along each bisection line forms a rake angle of between −10 and +10 degrees with the reference plane;

b) a floor between said land area and center of said body disposed at a lower elevation than said land area;

c) sloping wall portions inclined downwardly and inwardly from said land area to said floor;

d) a plateau disposed upon a central portion of said floor, said plateau spaced apart from said sloping wall portions and said plateau having sloped sides ascending from said floor, wherein the plateau has a top surface with a periphery defining corner curves, with each corner curve positioned about a respective bisector line, each bisector line defined as the line which bisects an angle formed by the intersection at an insert corner of lines extended from the cutting edge to said corner, and each corner curve defining the shape of the adjacent sloped side such that the adjacent sloped side forms a convex ascending surface from the floor to the top of the plateau and is aligned with the respective corner, said periphery tapering toward each corner such that the perpendicular distance from a respective bisector line to the periphery continuously decreases along the bisector line toward a corner and wherein the angle formed between the sloped side of the plateau at the respective bisector line of each corner and the reference platen is between 15–30 degrees; and e) a projection having a plurality of adjacent wave-like elements disposed upon a sloping wall portion between adjacent pairs of corner portions, each of said wave-like elements comprising a planar upper surface protruding from said sloping wall portion and located at an elevation below said land area and above said floor and extending toward a center from said sloping wall portion and also comprising a downwardly and inwardly slopped surface extending from said planar surface to said floor, said wave-like elements being spaced from said corner portions to define a chip curling zone between said corner portions and said projection and between respective adjacent wave-like elements wherein the angle formed between the slope of each wave-like element along a line perpendicular to an adjacent peripheral wall and the reference plane is between 15–25 degrees.

10. An indexable cutting insert comprising a polygonal body of war resistant material, said body including top and bottom surfaces and therebetween a peripheral wall with sides and rounded corners, the intersection of said peripheral wall and said top surface forming a cutting edge, said top surface comprising:

a) a land area joining said cutting edge and extending inwardly toward a center of said body wherein a reference plane is defined by a plane intersecting the land area t the corners along the cutting edge;

b) a floor between said land area and center of said body disposed at a lower elevation than said land area, c) sloping wall portions inclined downwardly and inwardly from said land area to said floor;

d) an elevated planar portion disposed upon a central portion of said floor, said planar portion spaced apart from said sloping wall portions, having planar portion sloped sides ascending from said floor and having an upper surface with a perimeter, said upper surface being at a lower elevation than said land area; and e) a plateau disposed upon said elevated planar portion and within the perimeter of said planar portion upper surface, said plateau having plateau sloped sides ascending from said planar portion and further having a top surface with a periphery tapering toward each corner and defining corner curves.

11. The cutting insert according to claim 10 wherein each corner curve is positioned about a respective bisector line, each bisector line defined as the line which bisector line, each bisector line defined as the line which bisects an angle formed by the intersection at an insert corner of liens extended from the cutting edge to said corner with each corner curve defining the shape of the adjacent sloped side such that the adjacent sloped side forms a convex ascending surface from the elevated planar portion to the top of the plateau and is aligned with the respective corner.

12. The cutting insert according to claim 11 wherein in the region of the corner curves the plateau sloped side is parallel to and flush with the elevated planar portion sloped side such that a continuous ascending surface is formed from the floor to the top of said plateau.

13. The cutting insert according to claim 12 wherein the periphery of said plateau further comprises curves defining convex ascending surfaces at locations between respective corner curves.

* * * * *